3,522,672
MAP HOLDER AND VIEWER
Fred W. Hinds, P.O. Box 2565,
San Bernardino, Calif. 92406
Filed May 24, 1968, Ser. No. 731,999
Int. Cl. G09f 11/24
U.S. Cl. 40—86                                10 Claims

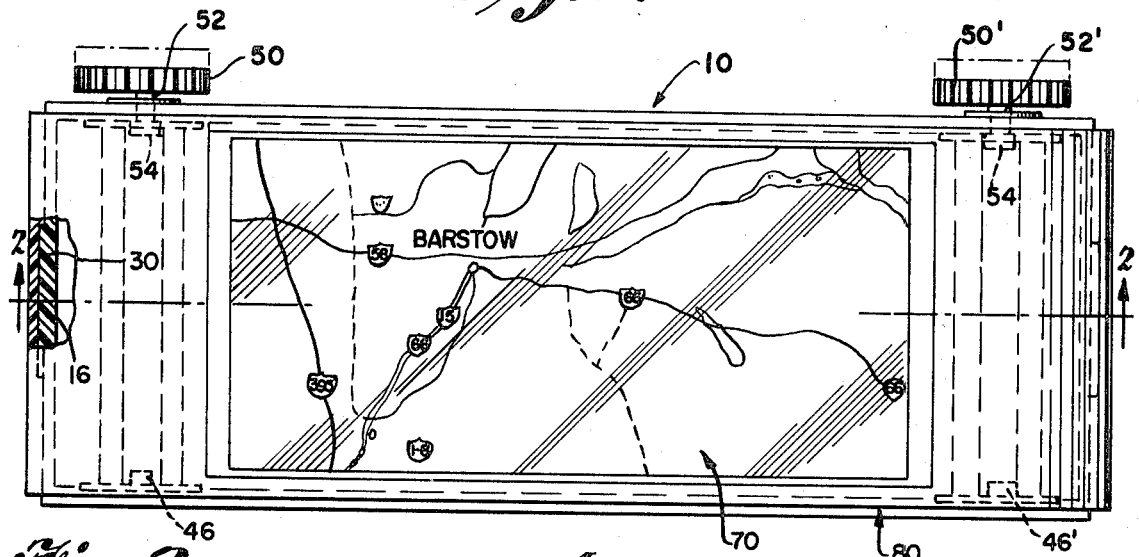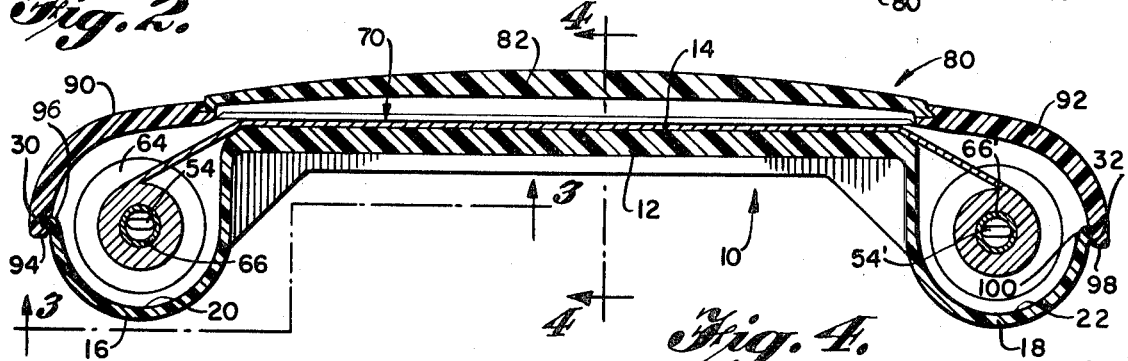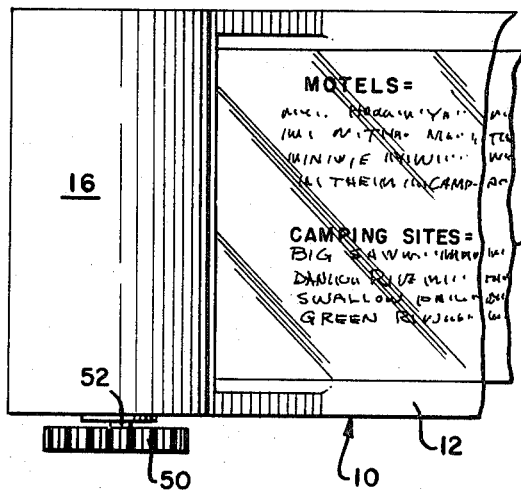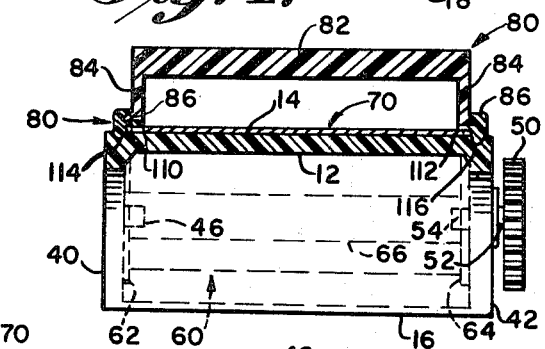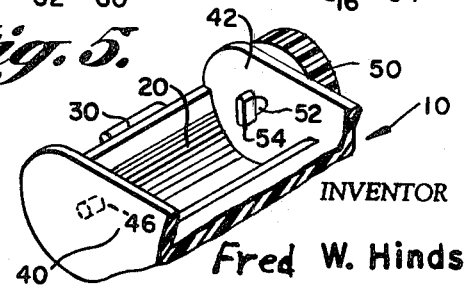
INVENTOR
Fred W. Hinds
BY Shoemaker and Mattare
ATTORNEYS United States Patent Office 3,522,672
Patented Aug. 4, 1970

ABSTRACT OF THE DISCLOSURE

A base portion includes a transparent intermediate map support portion and reel support means at opposite ends thereof including recesses for receiving and supporting a reel therein. A movable drive shaft is associated with each recess for turning a reel disposed therewithin. A cover means includes a central transparent lens portion for reading a map, and opposite ends of the cover portion close off the recesses in the base portion and are adapted to snap over projections provided at opposite ends of the base portion for holding the cover portion in operative position.

BACKGROUND OF THE INVENTION

The present invention relates to a map holder and viewer which is especially adapted for use with strip road maps as employed when making a long overland trip by car and the like.

It is a common practice when taking extended journeys to employ strip road maps so that the route to be taken can be readily determined. A map holder and viewer enables such road maps to be readily handled and easily observed. A particular area of the map can be effectively viewed, and the current location of the traveler can be followed at all times.

Map holders and viewers have been provided in the prior art, and this type of construction must of course be readily portable and maneuverable within a car so that it can be observed when desired. Additionally, the device should be capable of being quickly and easily assembled and disassembled so as to gain access to the map disposed therewithin and to replace the map when necessary.

SUMMARY OF THE INVENTION

The present invention provides a simple, inexpensive and compact map holder and viewer which is readily portable and which can be easily maneuvered within an automotive vehicle and the like.

The automative trip maps utilized with the device can be stored on separate reels which are readily insertable and removable with respect to the device of the present invention.

When a map is disposed in operative position within the device, manually operative drive shaft means can be employed for selectively moving the map.

The cover means of the present invention includes a central transparent magnifying area which facilitates viewing of a map within the device.

Additionally, the cover of the present invention has opposite end portions which are adapted to close off the reel receiving recesses of the base portion of the device and which further are adapted to snap over projections provided at opposite ends of the base portion of the structure whereby the base and cover portions of the map holder and viewer can be readily assembled and disassembled.

In addition, the base portion includes an intermediate map support portion which is transparent so that the rear portion of the strip map may be viewed simultaneously with the front portion thereof. Accordingly advertising matter may be placed on the rear surface of the strip map which will correspond with a particular area on the front of the map.

BRIEF DESCRIPTION OF THE DRAWING

FIG. 1 is a top view partly broken away illustrating a map holder and viewer according to the present invention;

FIG. 2 is a sectional view taken substantially along line 2—2 of FIG. 1 looking in the direction of the arrows;

FIG. 3 is a bottom view of the device shown in FIG. 2 looking upwardly along line 3—3 of FIG. 2 in the direction of the arrows;

FIG. 4 is a sectional view taken substantially along line 4—4 of FIG. 2 looking in the direction of the arrows; and FIG. 5 is a top perspective view of one end of the base portion of the device.

DESCRIPTION OF THE PREFERRED EMBODIMENT

Referring now to the drawing wherein like reference characters designate corresponding parts throughout the several views the device includes a base portion indicated generally by reference numeral 10 formed of a suitable material such as plastic or the like. This base portion includes a generally flat intermediate map support portion 12 having an upwardly facing support surface 14 as seen in FIG. 2. The portion 12 of the base portion is of transparent material so that the rear face of a road map supported in the apparatus may be readily viewed.

The base portion includes opposite end portions 16 and 18 which depend from the intermediate portion 12 as seen in FIG. 2 and which define arcuate recesses 20 and 22 therewithin for receiving reels hereinafter described.

Projections 30 and 31 are formed integral with the opposite end portions 16 and 18 of the base portion respectively, these laterally extending projections serving a purpose hereinafter described.

Referring now to FIGS. 4 and 5, the end portion 16 of the base portion includes opposite side walls 40 and 42 which close off opposite ends of the recess 20. An inwardly extending stub shaft portion 46 is formed integral with the side wall 40.

A manually engageable drive wheel 50 is fixed to a shaft 52 which is slidably positioned within a suitable hole provided in side wall 42 of the base portion. The inner end of shaft 52 has an enlarged portion 54 thereon which is adapted to engage a slot provided in a cooperating reel.

The reels employed in the present invention may be substantially identical with the film spools as used in the "620" Eastman camera manufactured by Eastman Kodak Company, 343 State St., Rochester, N.Y. 14650. A reel is indicated generally by reference numeral 60 in FIG. 4 and includes opposite circular sheet metal heads 62 and 64 joined by a longitudinally slotted tubular shaft 66.

In operation, the stub shaft 46 is adapted to be received within one end of the tubular shaft 66, and the enlarged portion 54 on the drive shaft 52 is adapted to be inserted in a suitable slot provided at the opposite end of the reel.

This construction enables the reel to be inserted and then drivingly connected with the drive shaft, whereupon the drive wheel 50 is adapted to rotate the associated reel as required. When it is desired to subsequently remove the reel, the hand wheel 50 is drawn outwardly to remove the portion 54 from the slot in the reel.

It should be understood that the reel supporting and driving arrangement at the opposite end of the base portion is substantially identical with that just described, and accordingly similar components at the opposite end of the base portion have been given the same reference numerals primed.

Accordingly, a reel having a map thereon may be inserted at either end of the base portion, and the map then unreeled and interconnected with the slotted tubular shaft of the reel at the opposite end of the base portion, so that the map can then be selectively unreeled from one reel across the intermediate map support portion 12 and onto the other reel whereby the entire strip may be sequentially reviewed. As seen particularly in FIG. 2, a map 70 is illustrated as mounted in operative position within the apparatus and as being unreeled from one of the reels onto the other at opposite ends of the base portion.

A cover portion is indicated generally by reference numeral 80, and a transparent magnifying lens 82 is supported by an intermediate central part of this cover portion.

As seen most clearly in FIG. 4, the lens 82 which may be formed of plastic, glass and the like includes a depending peripheral flange portion 84 having an outwardly extending tapered bead 86 which fits within a corresponding groove provided in the adjacent parts of the cover portion for holding the lens in operative position.

One end portion 90 of the cover extends over and closes off the upper portion of the recess 20 within the base portion. The terminal end 94 of the end portion 90 is adapted to snap over the projection 30 provided on end 16 of the base portion. This terminal end 94 of the cover portion is provided with a groove 96 adapted to snugly receive the projection 30 so as to positively hold the cover portion in operative position.

The opposite end 92 of the cover portion is disposed in overlying relationship to the recess 22 formed in end 18 of the base portion. The terminal end 98 of end 92 of the cover portion is adapted to snap over the projection 32, and this terminal end 98 is provided with a groove 100 for snugly receiving the projection 92 for positively holding the cover in operative position.

It is apparent that the cover portion is adapted to be pressed onto the base portion and snapped into the operative position shown in FIG. 2. When it is desired to disassemble the components, one end of the cover portion can be pried away from the associated end of the base portion and the cover portion thereupon readily removed for replacing or adjusting the map within the device when so desired.

As seen in FIG. 3, the transparent intermediate map support portion 12 of the base portion 10 enables the rear surface of the map 70 to be readily observed.

It should also be noted as seen in FIG. 4 that the opposite edge portions of the map 70 are disposed beneath the inwardly extending portions 110 and 112 of the opposite sides of the cover portion so as to be held down and to prevent the map from curling upwardly, thereby maintaining the map in flat relationship on the underlying support surface 14 of the base portion.

It should also be noted as seen in FIG. 4 that the opposite sides of the cover portion may be provided with depending beads 114 and 116 adapted to fit within suitable grooves provided in the upper surface of the base portion to thereby assist in properly positioning the cover portion with respect to the base portion.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A map holder and viewer comprising a base portion including an intermediate transparent map support and viewing portion and reel support means depending from opposite ends thereof, a readily removable and replaceable cover portion on said base portion and including a readily removable and replaceable snap fitted lens portion at an intermediate portion thereof for reading a map supported on said intermediate map support portion, and cooperating means on said base portion and said cover portion to enable the cover portion to be snap fitted onto said base portion and retained in supported position thereon by said snap fit, and snap fitting means on said cover and said lens for snap fitting said lens to said cover.

2. Apparatus as defined in claim 1 wherein said reel support means at opposite ends of said base portion includes a pair of arcuate recesses.

3. Apparatus as defined in claim 2 wherein said base portion at each end thereof includes a fixed stub shaft extending into the associated recess, and an oppositely disposed rotatable and axially movable drive shaft for engaging a cooperating reel.

4. Apparatus as defined in claim 1 wherein said cooperating means on said base portion includes projection means disposed at opposite ends of said base portion.

5. Apparatus as defined in claim 4 wherein said projection means includes an integral laterally extending portion provided at each end of said base portion.

6. Apparatus as defined in claim 1 wherein said reel support means at opposite ends of said base portion includes a recess formed at each end of said base portion, opposite ends of said cover portion being disposed in overlying relationship to said recesses to close off the upper portions of said recesses.

7. Apparatus as defined in claim 6 wherein said opposite ends of said cover portion slope downwardly from the intermediate portion thereof.

8. Apparatus as defined in claim 1 wherein said cooperating means includes projection means at opposite ends of said base portion and extending laterally therefrom, said cover portion having opposite end portions adapted to snap over said projection means to hold the cover portion in position.

9. Apparatus as defined in claim 8 wherein said opposite end portions of the cover portion are provided with groove means for receiving said projection means to positively hold the cover portion in place.

10. A map holder and viewer comprising a plastic base portion including an intermediate transparent map support and viewing portion having arcuate reel support recesses depending integrally from opposite ends thereof and each supporting a reel therein entirely below the plane of the map support and viewing portion so that a map or the like carried on said reels is constrained to move on the surface of said map support and viewing portion, the opposite end portions of the base turned upwardly and terminating intermediate the lowermost portion of the reel support recesses and the plane of the map support and viewing portion and having an outwardly directed rib formed integrally thereon, end wall means integral with said base closing the opposite ends of said recesses and stub shaft means integral with one said end wall and extending into each said recess, the other end wall of each said recess having a centrally disposed opening therein through which is received a rotatable and axially movable drive shaft, said stub shaft and drive shaft being received in opposite end bore portions of the reel in the associated recess for rotation thereof, a plastic cover having a generally flat intermediate portion through the center of which is a rectangular opening and smoothly downwardly curved opposite end portions, the inner marginal end surface of said downwardly turned end portions having a recess therein in snap fitting registry with the rib on said base end portions with said rectangular opening disposed opposite said map support and viewing portion, said cover including integral side walls depending from opposite edges thereof, said side walls each having a bead along the lowermost edge thereof received in a complementary slot along the edges of the upper surface of said base to aid in properly orienting said cover on said base, and a lens snap fitted into the rectangular opening through said cover.

References Cited

UNITED STATES PATENTS

| | | | |
|---|---|---|---|
| 669,682 | 3/1901 | Carver | 40—86 |
| 997,166 | 7/1911 | Weber | 40—86 |
| 1,312,445 | 8/1919 | Johnson | 40—86 |
| 1,461,842 | 7/1923 | Westman | 40—86 |

EUGENE R. CAPOZIO, Primary Examiner

W. H. GRIEB, Assistant Examiner